(12) United States Patent
Chen et al.

(10) Patent No.: US 9,979,342 B2
(45) Date of Patent: May 22, 2018

(54) SWITCH RELUCTANCE MOTOR WIDE SPEED-REGULATION RANGE CROSS-CONTROL METHOD

(71) Applicant: CHINA UNIVERSITY OF MINING AND TECHNOLOGY, Jiangsu (CN)

(72) Inventors: Hao Chen, Jiangsu (CN); He Cheng, Jiangsu (CN); Zhou Yang, Jiangsu (CN); Qing Wang, Jiangsu (CN); Qianlong Wang, Jiangsu (CN); Weilong Huang, Jiangsu (CN)

(73) Assignee: CHINA UNIVERSITY OF MINING AND TECHNOLOGY, Jiangsu (CN)

( * ) Notice: Subject to any disclaimer, the term of this patent is extended or adjusted under 35 U.S.C. 154(b) by 0 days. days.

(21) Appl. No.: 15/300,102

(22) PCT Filed: Oct. 16, 2015

(86) PCT No.: PCT/CN2015/092049
§ 371 (c)(1),
(2) Date: Sep. 28, 2016

(87) PCT Pub. No.: WO2016/066025
PCT Pub. Date: May 6, 2016

(65) Prior Publication Data
US 2017/0187314 A1   Jun. 29, 2017

(30) Foreign Application Priority Data

Oct. 30, 2014   (CN) .......................... 2014 1 0605005

(51) Int. Cl.
*H02P 1/46*    (2006.01)
*H02P 25/08*   (2016.01)
(Continued)

(52) U.S. Cl.
CPC ................. *H02P 25/08* (2013.01); *H02P 6/10* (2013.01); *H02P 25/086* (2013.01); *H02P 6/08* (2013.01)

(58) Field of Classification Search
CPC ........ G05B 19/416; G05B 2219/37312; H02P 25/08; H02P 6/08
See application file for complete search history.

(56) References Cited

U.S. PATENT DOCUMENTS

2013/0207588 A1   8/2013  Lee et al.
2017/0250635 A1*  8/2017  Chen .......................... H02P 6/24

FOREIGN PATENT DOCUMENTS

CN   103187907 A   7/2013
CN   103840719 A   6/2014
(Continued)

OTHER PUBLICATIONS

Li, Tian et al., "Research on Adjustment Performance of Switched Reluctance Motor," *China Academic Journal Electronic Publishing House*, 2006, 10: Abstract.

*Primary Examiner* — Karen Masih
(74) *Attorney, Agent, or Firm* — Saliwanchik, Lloyd & Eisenschenk

(57) ABSTRACT

A switch reluctance motor wide speed-regulation range cross-control method, the switch reluctance motor wide speed-regulation range control system consisting of a revolving speed regulator, a current chopper controller, an angle position controller, a chopper counter, a comparison selector and two resettable constant registers; the chopper counter counts the current chopping number of each electrical period, and according to the comparison result between a counting value of the chopper counter and a constant value set by the two constant registers, the comparison selector selects the current chopper controller or the angle position controller, such that when in the three phases (Continued)

of low revolving speed, medium revolving speed and high revolving speed or in the runtime of acceleration, deceleration and uniform velocity, the current chopper controller and the angle position controller can automatically switch, and seamlessly connect without being affected by load change, and switching from a turn-on angle to a turn-off angle will not cause fluctuation of torque or revolving speed of a switch reluctance motor, thus the switch reluctance motor system runs stably and has good value for engineering application.

1 Claim, 1 Drawing Sheet

(51) Int. Cl.
     *H02P 6/10*      (2006.01)
     *H02P 25/086*      (2016.01)
     *H02P 6/08*      (2016.01)

(56) References Cited

FOREIGN PATENT DOCUMENTS

CN      104333275 A      2/2015
JP      2014-68499 A      4/2014

\* cited by examiner

_(1)_

SWITCH RELUCTANCE MOTOR WIDE SPEED-REGULATION RANGE CROSS-CONTROL METHOD

CROSS REFERENCE TO RELATED APPLICATIONS

This application is a National Stage Application of International Application Number PCT/CN2015/092049, filed Oct. 16, 2015; which claims priority to Chinese Application No. 201410605005.7, filed Oct. 30, 2014; all of which are incorporated herein by reference in their entirety.

FIELD OF THE INVENTION

The present invention relates to a method for cross control of wide speed regulation range of switched reluctance motor, and particularly to a speed regulating method applicable to switched reluctance motor systems with multiple phases and multiple topological structures.

BACKGROUND OF THE INVENTION

Switched reluctance motor has a simple and firm structure, high reliability and robustness, large starting torque and wide speed regulation range, and maintains high efficiency in a wide working area of rotational speed and torque, but it usually adopts different control modes in a low speed section and a high speed section. It adopts current chopper control in the low speed section and it adopts angle position control in the high speed section. When load is constant, in order to assure smooth switchover between the two control modes, cut-and-try method may be adopted to determine the turn-on angle and turn-off angle of switched reluctance motor at the switchover moment. However, when load is changed, the two control modes have different turn-on angles and turn-off angles of switched reluctance motor at the switchover moment. Improper switchover of turn-on angle and turn-off angle will cause fluctuation of torque or rotational speed of switched reluctance motor and make speed regulating system of switched reluctance motor be unable to work stably. How to realize automatic switchover and seamless connection between the two control modes and eliminate switchover jittering is one of the important directions for technological breakthrough of current switched reluctance motor systems.

SUMMARY OF THE INVENTION

The object of the present invention is to provide a method for cross control of wide speed regulation range of switched reluctance motor including low, medium and high rotational speed to tackle the problems in the prior art and to realize automatic switchover and seamless connection between current chopper control and angle position control.

The method for cross control of wide speed regulation range of switched reluctance motor provided by the present invention comprises a control system consisting of a revolving speed regulator, a current chopper controller, an angle position controller, a chopper counter, a comparison selector and two settable constant registers including Up_const and Down_const., Current chopping limit $i_{ref}$ and turn-on angle $\theta_{on}$ and turn-off angle $\theta_{off}$ of power converter master switch are regulated through the speed regulator. The chopper counter counts current chopping number of each electrical period. The comparison selector selects the current chopper controller or the angle position controller. In the two settable constant registers, the constant value set by constant register Up_const is larger than the constant value set by constant register Down_const. The count value of the chopper counter is compared with the constant value set by constant register Up_const and the constant value set by constant register Down_const.

during acceleration stage of switched reluctance motor, when the count value of the chopper counter is larger than the constant value set by constant register Down_const, the comparison selector selects the current chopper controller, and the speed regulator raises current chopping limit to increase the rotational speed of switched reluctance motor; when the count value of the chopper counter is smaller than the constant value set by constant register Down_const, the comparison selector selects the angle position controller, and the speed regulator moves the value of turn-on angle forward to raise the rotational speed of switched reluctance motor;

during deceleration stage of switched reluctance motor, when the count value of the chopper counter is larger than the constant value set by constant register Down_const and smaller than the constant value set by constant register Up_const, the comparison selector selects the current chopper controller, and the speed regulator lowers current chopping limit to reduce the rotational speed of switched reluctance motor; when the count value of the chopper counter is smaller than the constant value set by constant register Down_const or larger than the constant value set by constant register Up_const, the comparison selector selects the angle position controller, and the speed regulator moves the value of turn-on angle backward to reduce the rotational speed of switched reluctance motor;

when switched reluctance motor enters a stage of running at a constant speed, the controller selected by the comparison selector is the controller adopted at the moment before switched reluctance motor enters a stage of running at a constant speed. The type of the controller remains unchanged.

Beneficial effect: The present invention realizes speed adjustable operation of switched reluctance motor systems with multiple phases and multiple topological structures in a wide range of rotational speed, including low, medium and high speed. It ensures automatic switchover and seamless connection between current chopper control and angle position control during three stages: low rotational speed, medium rotational speed and high rotational speed and during operation at an accelerated, decelerated or constant speed without being affected by load change. The switchover of turn-on angle and turn-off angle will not cause fluctuation of torque or rotational speed of switched reluctance motor. The switched reluctance motor system works stably and has a good engineering application value.

DETAILED DESCRIPTION OF THE EMBODIMENTS

Figure 1:
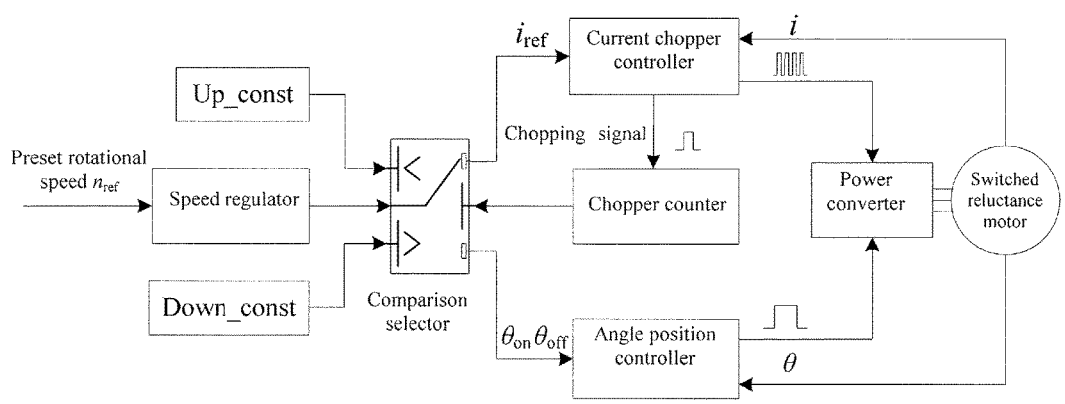
FIG. 1 is a structural schematic of the control system provided by the present invention.

The embodiments of the present invention are further described by referring to the following accompanying drawings:

As shown in FIG. 1, the method for cross control of wide speed regulation range of switched reluctance motor provided by the present invention makes use of a system for cross control of wide speed regulation range of switched reluctance motor. The system consists of a speed regulator, a current chopper controller, an angle position controller, a chopper counter, a comparison selector and two settable constant registers including Up_const and Down_const. Current chopping limit $i_{ref}$ and turn-on angle $\theta_{on}$ and turn-off angle $\theta_{off}$ of power converter master switch are regulated through the speed regulator. The chopper counter counts current chopping number of each electrical period. The comparison selector selects the current chopper controller or the angle position controller. In the two settable constant registers, the constant value set by constant register Up_const is larger than the constant value set by constant register Down_const. The count value of the chopper counter is compared with the constant value set by constant register Up_const and the constant value set by constant register Down_const. The preset rotational speed $n_{ref}$ is regulated:

a) During the acceleration stage, switched reluctance motor is accelerated from low rotational speed to high rotational speed. When switched reluctance motor runs below base speed, back electromotive force is small. When current chopper control is adopted, chopping times are large; when the count value of the chopper counter is larger than the constant value set by constant register Down_const, the comparison selector selects the current chopper controller, and the speed regulator raises current chopping limit to increase the rotational speed of switched reluctance motor; when the count value of the chopper counter is smaller than the constant value set by constant register Down_const, the comparison selector selects the angle position controller, and the speed regulator moves the value of turn-on angle forward to raise the rotational speed of switched reluctance motor; if the count value of the chopper counter is larger than the constant value set by constant register Down_const again after the value of turn-on angle is moved forward, the comparison selector will switch to the current chopper controller again, and the speed regulator will raise current chopping limit to increase the rotational speed of switched reluctance motor; if the count value of the chopper counter is smaller than the constant value set by constant register Down_const again, the comparison selector will switch to the angle position controller again, and the speed regulator will move the value of turn-on angle forward to raise the rotational speed of switched reluctance motor. When switched reluctance motor runs at a high speed, back electromotive force is large, the current does not reach chopping limit, the count value of the chopper counter is always smaller than the constant value set by constant register Down_const, the comparison selector always selects the angle position controller, and the speed regulator moves the value of turn-on angle forward to raise the rotational speed of switched reluctance motor.

b) during the deceleration stage, switched reluctance motor is decelerated from high rotational speed to low rotational speed. When switched reluctance motor runs at a high speed, back electromotive force is large, current does not reach chopping limit, the count value of the chopper counter is always smaller than the constant value set by constant register Down_const, the comparison selector selects the angle position controller, and the speed regulator moves the value of turn-on angle backward to reduce the rotational speed of switched reluctance motor. Following the reduction of the rotational speed of switched reluctance motor, back electromotive force decreases and the count value of the chopper counter increases gradually; when the count value of the chopper counter is larger than the constant value set by constant register Down_const and smaller than the constant value set by constant register Up_const, the comparison selector selects the current chopper controller, and the speed regulator lowers current chopping limit to reduce the rotational speed of switched reluctance motor. Thereafter, chopping times increase gradually, and the count value of the chopper counter increases gradually. When the count value of the chopper counter is larger than the constant value set by constant register Up_const, the comparison selector selects the angle position controller, and the speed regulator moves the value of turn-on angle backward to reduce the rotational speed of switched reluctance motor; following the backward movement of the value of turn-on angle, the count value of the chopper counter is smaller than the constant value set by constant register Up_const again, but larger than the constant value set by constant register Down_const, the comparison selector selects the current chopper controller, and the speed regulator lowers current chopping limit to reduce the rotational speed of switched reluctance motor; if the count value of the chopper counter is smaller than the constant value set by constant register Down_const, the comparison selector will select the angle position controller, and the speed regulator will move the value of turn-on angle backward to reduce the rotational speed of switched reluctance motor; if the count value of the chopper counter is larger than the constant value set by constant register Up_const, the comparison selector will also select the angle position controller, and the speed regulator will move the value of turn-on angle backward to reduce the rotational speed of switched reluctance motor; after the rotational speed of switched reluctance motor is reduced to below base speed, the comparison selector will always select the current chopper controller, and the speed regulator will lower current chopping limit to reduce the rotational speed of switched reluctance motor;

c) During the stage of running at a constant speed, the controller selected by the comparison selector is the controller adopted at the moment before switched reluctance motor enters a stage of running at a constant speed. The type of the controller remains unchanged. The speed regulator regulates current chopping limit or the value of turn-on angle, and keeps the rotational speed of switched reluctance motor unchanged.

Figure 2:
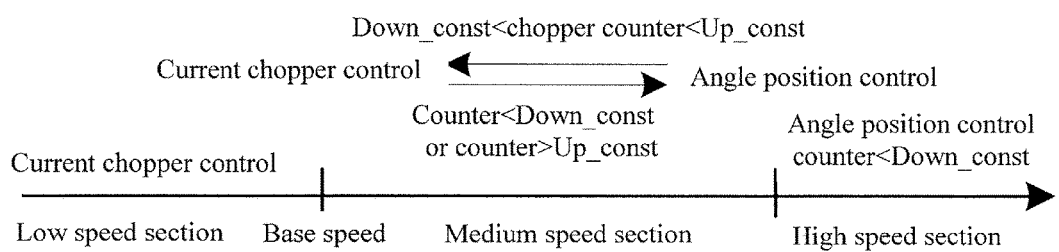
FIG. 2 is a schematic showing the present invention automatically divides speed regulation range into three stages: low, medium and high rotational speed.

As shown in FIG. 2, the method for cross control of wide speed regulation range of switched reluctance motor automatically divides the speed regulation range of switched reluctance motor system into three stages: low, medium and high rotational speed. In the low rotational speed section below base speed, the current chopper controller is adopted; in the medium rotational speed section, the current chopper controller and the angle position controller are adopted for cross control; in the high speed section, the angle position controller is adopted. The method ensures automatic switchover and seamless connection between current chopper control and angle position control in three stages: low rotational speed, medium rotational speed and high rotational speed and during operation at an accelerated, decelerated or constant speed without being affected by load change. The switchover of turn-on angle and turn-off angle will not cause fluctuation of torque or rotational speed of switched reluctance motor. The switched reluctance motor system works stably.

The invention claimed is:

1. A method for cross control of wide speed regulation range of switched reluctance motor, comprising a control system consisting of a speed regulator, a current chopper controller, an angle position controller, a chopper counter, a comparison selector and two settable constant registers including Up_const and Down_const, characterized in that current chopping limit $i_{ref}$ and turn-on angle $\theta_{on}$ and turn-off angle $\theta_{off}$ of power converter master switch are regulated through the speed regulator according to the number of current chopper per electrical period of switched reluctance motor; specific steps are as follows: step 1, current chopper controller uses chopper control method to adjust the motor phase current; the chopper counter counts current chopping number of each electrical period; step 2, the comparison selector compares the count value of the chopper counter and the values of the two settable constant registers including Up_const and Down_const, wherein the constant value set by constant register Up_const is larger than the constant value set by constant register Down_const; step 3, selecting current chopper controller or angle position controller according to the comparison results; the selection logic can be divided into the motor acceleration stage, the motor deceleration stage and the motor uniform speed running stage according to the running state of the switched reluctance motor, the detailed steps are as follows:

during acceleration stage of switched reluctance motor, step 1, judging the count value of the chopper counter and the value of the constant register Down_const; step 2, when the count value of the chopper counter is larger than the constant value set by constant register Down_const, the comparison selector selects the current chopper controller; when the count value of the chopper counter is smaller than the constant value set by constant register Down_const, the comparison selector selects the angle position controller step 3, if the comparison selector chooses a current chopper controller, then the speed regulator raises the current chopping limit to increase the rotational speed of switched reluctance motor; if the comparison selector chooses an angular position controller, the speed regulator advances the turn-on angle to increase the rotational speed of switched reluctance motor;

during deceleration stage of switched reluctance motor, step 1, judging the count value of the chopper counter and the value of the constant register Down_const; step 2, when the count value of the chopper counter is larger than the constant value set by constant register Down_const and smaller than the constant value set by constant register Up_const, the comparison selector selects the current chopper controller; when the count value of the chopper counter is smaller than the constant value set by constant register Down_const or larger than the constant value set by constant register Up_const, the comparison selector selects the angle position controller; step 3, if the comparison selector chooses the current chopper controller, then the speed regulator reduces the current chopping limit to reduce the rotational speed of switched reluctance motor, if the comparison selector chooses the angular position controller, then the speed regulator moving the turn-on angle backward to reduce the rotational speed of switched reluctance motor;

when switched reluctance motor enters a stage of running at a constant speed, the controller selected by the comparison selector is the controller adopted at the moment before switched reluctance motor enters a stage of running at a constant speed; the type of the controller remains unchanged.

* * * * *